Patented Aug. 17, 1948

2,446,991

UNITED STATES PATENT OFFICE 2,446,991

MELAMINE-FORMALDEHYDE RESINS PLASTICIZED WITH ALKALI LACTATE

James Ranald Alexander, Donald Burton, and Frederick Hausmann, Bolton, England, assignors to William Walker & Sons, Limited, Bolton, England, a British company No Drawing. Application July 8, 1947, Serial No. 759,718

7 Claims. (Cl. 260—32.2)

This invention relates to amino formaldehyde resins obtainable by condensation with formaldehyde or a substance liberating formaldehyde with melamine.

Such melamine formaldehyde resins are known but it is also well known that intermediate condensation products of such resins dry out to yield very hard and brittle products. The brittleness of these resin condensation products is a disadvantage and precludes their use for many commercial applications.

In the case of melamine-formaldehyde resins whose partial condensates are soluble in organic solvents the problem of plasticizers is not as difficult as in the case of the water-soluble types of resins. In the former case cellulose nitrate plasticizers such as butyl phthalate or such soft synthetic resins as oil modified alkyd resins may be used. Such placticisers are, however, water-insoluble and cannot be used for the water-soluble types of intermediate condensation products of melamine formaldehyde resins.

It is well known that mouldings or castings or coatings made from aqueous solutions of the intermediate condensation products of melamine formaldehyde resins, especially mouldings or castings or coatings in which no fillers are present, tend to develop surface crazing and to shrink on ageing. In the case of a moulding powder, comprising a finely divided solid filler impregnated with an intermediate condensation product of the resin, this tendency to crack or craze makes this type of plastic unsuited for mouldings with heavy metal inserts, while solid cast masses containing no filler often crack and crumble up after a comparatively short period in a warm, dry atmosphere.

One object of the invention is to prevent, or at least greatly reduce the tendency of melamine formaldehyde plastics to craze and crack on ageing.

Another object of the invention is to prevent, or at least greatly reduce the tendency of melamine formaldehyde mouldings to crack round metal inserts.

The addition of cellulose fillers greatly reduces the shrinkage of melamine formaldehyde resins but it completely destroys the transparency of the mass.

Another object of the invention is to produce transparent castings or mouldings which show little or no tendency to shrink, from melamine formaldehyde resins.

The addition of water-soluble plasticisers such as glycerol, sorbitol or other polyhydric alcohols to melamine formaldehyde resins reduces the tendency to crack of transparent masses cast therefrom but such addition is undesirable as it makes the mass liable to absorb water.

Another object of the invention is to prevent, or at least greatly reduce, the tendency of castings made from melamine formaldehyde resins and containing little or no filler, to crack or otherwise lose their transparency.

When melamine formaldehyde resins are used as glues for use in joining wood surfaces, the tendency of the glue layer to shrink and crack makes this type of glue unsuitable only for use where the glue layer is of minimum thickness and even pressure can be obtained. Where close contact cannot be obtained between the wood surfaces to be joined, special gap-filling glues have to be used.

A further object of the invention is to prevent, or at least greatly reduce the tendency of melamine formaldehyde adhesives to shrink and crack on drying out.

These objects can be secured, we have found, by incorporating in the water-soluble intermediate condensation product of a melamine formaldehyde resin, a plasticiser consisting of an alkali lactate, e. g. the lactate of ammonium, sodium or potassium. These lactates which are very soluble in water and can give syrupy solutions therein, have excellent plasticising properties for such resins. For example, the lactate can be added to an aqueous solution of the intermediate condensation and the mixture can then be cast or moulded and dried and the resin insolubilized. For transparent castings or mouldings, no filler is used but we may mix with the aqueous solution of intermediate condensation product and the alkali lactate a finely divided solid filler of the kind customarily employed for making plastic masses, especially a porous fibrous filler, e. g. wood meal, paper fibre, textile fibres or waste, ground leather, shoddy or the like. The products containing such filler may be moulded or cast or the filler may be impregnated with the plasticised resin solution and dried to product a moulding powder. The proportion of filler is usually less than that of the other ingredients and generally less than 40 per cent of the total dry weight of the composition.

The proportion of alkali lactate used depends upon the particular use to which the resin is to be put. Thus, for an adhesive for laminating leather, 2 parts by weight of alkali lactate only are required for 100 parts of resin. For an adhesive for wood which will not crack or shrink it is necessary to use about 15 parts by weight of alkali lactate for 100 parts of resin. Larger proportions of alkali lactate may be used for mouldings or castings but the most suitable amount is from 2 to 25 percent by weight of the whole mass, especially from 2 to 15 per cent.

Melamine-formaldehyde partial condensates can be rendered water-insoluble by heating with or without acid; they will also become insoluble when allowed to stand even without heating in presence of an acid or a substance acting as an acid such as an ammonium salt. When ammonium lactate is used as a plasticizer, therefore, a portion of this functions as an acid catalyst for the further condensation to the water-insoluble state.

The following examples illustrate, but do not limit the invention. In these examples, all parts are by weight.

Example 1

250 parts powdered melamine were dissolved in 800 parts of neutralised 37% Formalin at 80° C. The temperature was raised so that the mixture was gently refluxing at 100° C. for 15 minutes. While still hot 500 parts of the above partial condensate were mixed with 200 parts of 50% syrupy ammonium lactate and poured into a glass mould. On cooling and standing overnight a hard glass-clear moulding was obtained which retained its transparency throughout the drying period of 8–12 days, and which did not crack or craze.

The portion of the partial condensate to which no addition of lactate was made became turbid on cooling, later became an opaque solid mass, and finally cracked into small white fragments.

Example 2

50 parts powdered melamine were dissolved in 160 parts of neutralised 37% formalin at 80° C. The temperature was raised to 100° C. for 45 minutes after which 100 parts of the resin syrup were mixed with 45 parts of 50% sodium lactate. 0.5 part formic acid were then added and the clear mixture poured into a mould. On standing 12 hours a white opaque product was obtained which dried to a hard white solid during a period of 6–8 days at 18–20° C. The moulding showed little tendency to split or craze, whereas a similar moulding from the same partial condensate without the addition of sodium lactate began to craze after 15 hours and to split into pieces after 24 hours.

Example 3

To 500 parts of melamine formaldehyde syrup prepared as in Example 2 were added 200 parts of 50% potassium lactate. 0.1 part formic acid were then added and the mixture was poured into a mould and allowed to gelatinise.

A hard white solid was obtained which did not craze or split into pieces on further drying whereas the product obtained without the addition of the lactate cracked and disintegrated in 24–30 hours.

Example 4

To 250 parts of a solution of a partial condensate of melamine and formaldehyde prepared as in Example 1 were added 100 parts 50% ammonium lactate and 50 parts ground leather fibres. The mixture was stirred into a homogeneous mass and poured into a mould to gelatinise. After 12 hours a hard brown moulding was obtained which showed no tendency to crack after ageing for 3 weeks whereas a similar moulding without the addition of plasticiser showed two definite cracks after 3 days.

Example 5

To 100 parts of a melamine formaldehyde syrup prepared as in Example 2 were added 40 parts of 50% sodium lactate. To 70 parts of the above syrup were added 30 parts ground leather fibres which were then thoroughly wetted by the syrup. To a second portion of 70 parts syrup 0.1 part formic acid were added and the acid mixture then stirred into the first leather-resin composition. The product was poured into a mould and on drying a hard fibrous moulding was obtained which showed no surface crazing or cracking on further ageing.

Example 6

A moulding powder is made up with sodium lactate incorporated as follows: 25 parts powdered melamine are dissolved in 55 parts neutral 37% formalin at 80° C. and gently refluxed for 15 minutes. This resin syrup is then stirred into 22 parts vegetable tanned ground leather fibres wetted with 20 parts 50% sodium lactate. The paste so obtained is dried in a heated mixer at 50° C. to a moisture content of under 8%, preferably 6% and then ground to a fine powder.

The resulting brown powder can be moulded at 130° C. under 1 ton per sq. in. for 2 minutes.

The drying at 50° C. does not destroy the ability of the resin to flow but on moulding at 130° C. under pressure the resin is cured to the insoluble state.

This application is a continuation in part of co-pending applications of the applicants filed November 27, 1943, Serial No. 512,022 patented June 15, 1948, No. 2,443,368 and filed June 5, 1946 Serial No. 674,630.

We declare that what we claim is:

1. A composition of matter having a major proportion of melamine formaldehyde resin and a minor proportion of an alkali lactate.

2. A composition of matter having a major proportion of melamine formaldehyde resin and from 2 to 25% by weight of an alkali lactate.

3. A moulding powder consisting of a finely divided solid filler impregnated with an intermediate condensation product of a melamine formaldehyde resin, and an amount of a water-soluble alkali lactate from 2 to 25 per cent of the weight of the resin.

4. A transparent casting consisting of a melamine formaldehyde resin and from 2 to 25 per cent by weight of an alkali lactate.

5. A tough plastic showing substantially no tendency to crack and comprising a finely divided solid filler, a melamine formaldehyde resin and an amount of alkali lactate from 2 to 25 per cent of the weight of the resin.

6. A moulding powder consisting of finely divided leather impregnated with an intermediate condensation product of a melamine formaldehyde resin and an amount of a water-soluble alkali lactate from 2 to 25 per cent of the weight of the resin.

7. A tough plastic showing substantially no tendency to crack and comprising not more than 40 per cent by weight of a finely divided solid filler, a melamine formaldehyde resin and an amount of alkali lactate from 2 to 25 per cent of the weight of the resin.

JAMES RANALD ALEXANDER.
   DONALD BURTON.
   FREDERICK HAUSMANN.

REFERENCES CITED

The following references are of record in the file of this patent:

UNITED STATES PATENTS

| Number | Name | Date |
|---|---|---|
| 2,322,887 | Schwarz | June 29, 1943 |

OTHER REFERENCES

Morrell et al.: Synthetic Resins and Allied Plastics, London 1937; page 90.